United States Patent [19]

Kobayashi

[11] Patent Number: 4,872,746

[45] Date of Patent: Oct. 10, 1989

[54] LIGHT BEAM DEFLECTOR

[75] Inventor: Koji Kobayashi, Hino, Japan

[73] Assignee: Kowa Company Ltd., Japan

[21] Appl. No.: 145,032

[22] Filed: Jan. 19, 1988

[30] Foreign Application Priority Data

Jan. 16, 1987 [JP] Japan .................................. 62-6027

[51] Int. Cl.$^4$ .............................................. G02F 1/11
[52] U.S. Cl. ................................................. 350/358
[58] Field of Search ................. 350/358, 353, 354, 355

[56] References Cited

U.S. PATENT DOCUMENTS 4,367,926 1/1983 Hohki ................................. 350/358

FOREIGN PATENT DOCUMENTS 8600148 1/1986 World Int. Prop. O. .......... 350/358
8700300 1/1987 World Int. Prop. O. .......... 350/358

Primary Examiner—Eugene R. LaRoche
Assistant Examiner—Nathan W. McCutcheon
Attorney, Agent, or Firm—Bruce L. Adams; Van C. Wilks

[57] ABSTRACT

A light beam deflector according to the present invention comprises an acousto-optical element for deflecting a light beam at an angle of deflection which is dependent on the frequency of a drive signal applied thereto. This acousto-optical element has a deflection efficiency which is also dependent on the frequency of the drive signal. The frequency-dependence of the deflection efficiency is corrected by modulating the drive signal in amplitude with predetermined modulating data which are stored in the form of digital data and used to correct the characteristics so that the deflection efficiency of the acousto-optical element is substantially independent of the frequency of the drive signal.

12 Claims, 4 Drawing Sheets

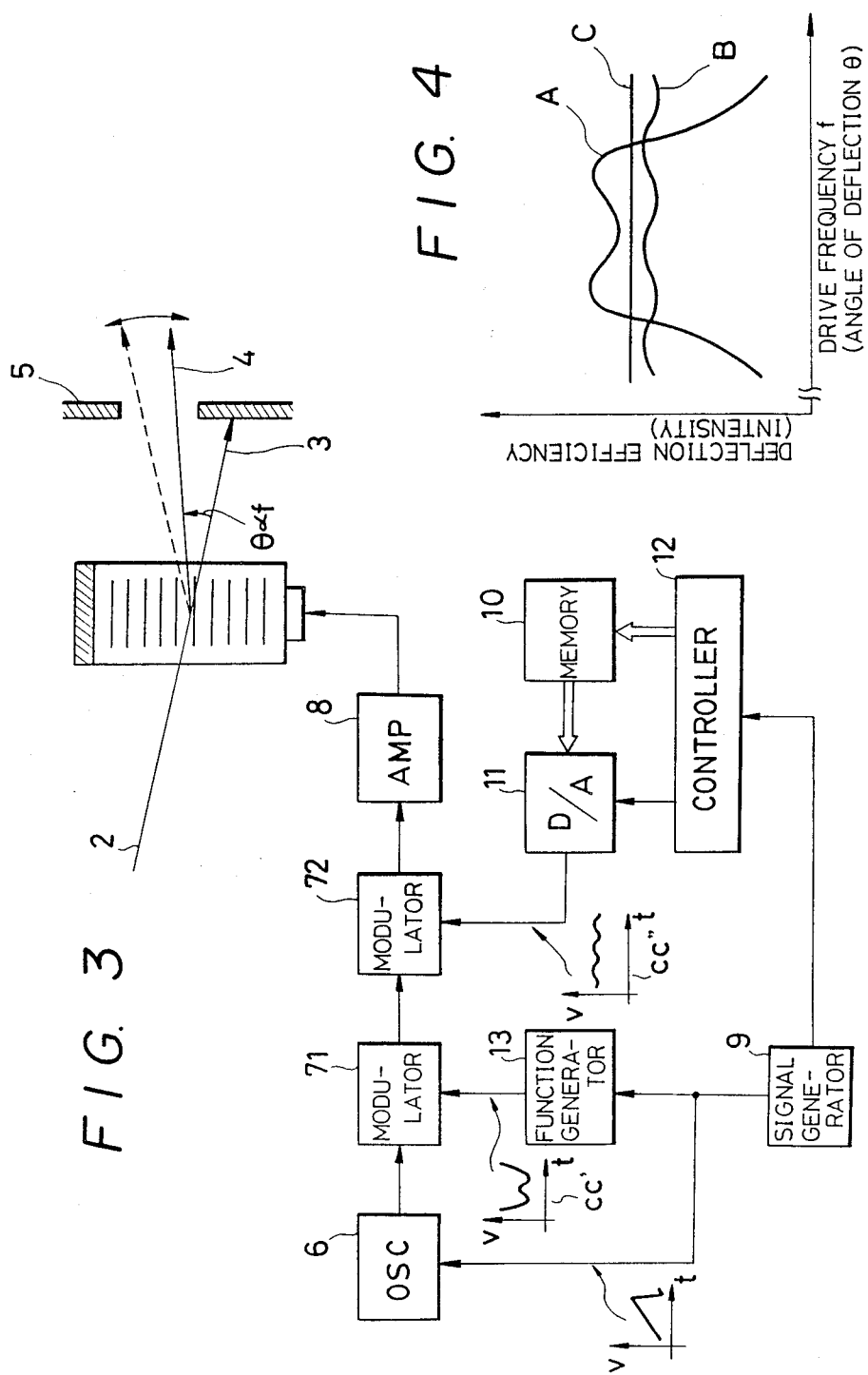

LIGHT BEAM DEFLECTOR

BACKGROUND OF THE INVENTION

1. Field of the Invention

This invention relates to a light beam deflector, and more particularly to a light beam deflector that uses an acousto-optical element to deflect the light from a predetermined light source.

2. Description of the Prior Art

As the light deflection means in, for example, laser-beam scanning microscopes and laser-beam scanning video recorders, it is known to use of an arrangement employing rotating mirrors or acousto-optic elements. Deflectors utilizing acousto-optic elements are particularly advantageous in that they have no mechanical moving parts and are stable and longlasting, and enable high scanning frequencies to be realized.

The structure of a known light beam deflector employing an acousto-optic element is shown in FIG. 6. In FIG. 6, light from a laser light source or the like is projected onto an acousto-optic element 1 as indicated by the symbol 2, and is deflected by the acousto-optic element 1. An aperture 5 in the drawing is for the purpose of obtaining only first-order diffraction light.

With this arrangement, by changing the frequency f of a high-frequency drive signal applied to the acousto-optic element 1, the angle $\theta$ of the first order diffraction light isolated from the incident beam (usually laser light) can be changed. The high-frequency drive signal is generated by a voltage controlled oscillator and is powered by the broadband amplifier 8.

However, there is a problem in that as the intensity (deflection efficiency) of the first-order diffraction light of the incident beam is not constant with respect to the drive frequency f, owing to the particular properties of the acousto-optical element. Accordingly the light intensity is dependent on the angle of deflection $\theta$.

FIG. 7 shows an example of the correspondence of deflection efficiency characteristics to the drive frequency. The characteristic prior art curve of FIG. 7 has a peak in the medium-high zone and in the medium-low zone.

In resolving this problem, a known technique has been used heretofore which is based upon the characteristic that the deflection efficiency being is substantially proportional to the intensity of the element drive signal. A waveform that approximates a deflection efficiency characteristic that is the inverse of that shown in FIG. 7 is produced by an analog type function generator circuit. By using this signal for modulating the amplitude of the element drive signal, nonuniformity in the deflection efficiency is cancelled out by changes in the drive power.

However, the deflection efficiency characteristics are affected not only by the properties of the acousto-optic element itself, but also by the frequency characteristics of the overall drive circuitry and the linear characteristics of the amplitude modulation circuitry. This being the case, it is extremely difficult to produce a perfectly inverse characteristic waveform by means of an analog type function generator, taking into account the overall characteristics of these circuits.

In addition, deflection efficiency is also dependent on the wavelength of the incident light beam, the angle of incidence of the light, the scanning frequency (repetition frequency of the deflection) and the like, and with the conventional system it has not been easy to adapt in cases where all of these conditions have changed.

On the other hand, there is a known technique in which a portion of light deflected by the acousto-optic element is detected by a photosensor and photoelectrically converted into a signal. The thus produced signal is applied to the driving circuit as a direct feedback to control the uniformity of the light intensity.

However, the deflectors utilizing the acousto-optical effect define an inherent time (access time), generally more than about several micro-second, which is required for supersonic waves traveling in the acousto-optical medium to traverse the light beam. As a result, the feedback system suffers from such lag time and the speed of the control becomes inevitably low. In such a device, it is thus impossible to correct completely the nonuniformity of the deflection efficiency in the high frequency scanning system.

There has therefore been a problem in that where a light beam deflector employing an acousto-optic element is used for video image input/output operations, such as for example in a laser-beam scanning microscope or laser-beam scanning video recorder, with a conventional system, with respect to the direction of deflection by the element, there remain variations in light intensity which cannot be fully corrected.

SUMMARY OF THE INVENTION

It is, therefore, an object of the present invention to provide a light beam deflector using an acousto-optical element being capable of easily correcting the deflection efficiency thereof.

It is another object of the present invention to provide a light beam deflector using an acousto-optical element being capable of deflecting a light beam at a predetermined angle of deflection with an intensity of light which is substantially constant independently of the frequency of the drive signal applied to the acousto-optical element.

According to the present invention, a light beam deflector adapted to deflect a light beam from a light source comprises an acousto-optical element for deflecting the light beam at an angle of deflection which is dependent on the frequency of a drive signal applied thereto The acousto-optical element has a deflection efficiency which is also dependent on the frequency of the drive signal. The light beam deflector further comprises means for generating the drive signal, a modulator for modulating the drive signal amplitude with predetermined modulating data, and a memory for storing the modulating data which have such characteristics that they are frequency-dependent. The amplitude of the drive signal is modulated by the modulator in such a manner that the deflection efficiency of the acousto-optical element is substantially independent of the frequency of the drive signal.

With the above arrangement, whatever the characteristics possessed by the acousto-optical element or the drive system thereof, uniform light beam deflection efficiency characteristics can be obtained easily irrespective of the acousto-optical element drive frequency. This arrangement has no defect due to the lag time appearing in the feedback control system. Moreover, even when changes occur in various conditions such as the wavelength of the light, the angle of incidence and the scanning frequency, such changes can be adapted to with ease. Therefore, when the light beam deflector according to the present invention is employed in, for example, a laser-beam scanning microscope or a laser-beam scanning video recorder, there is no problem about the intensity of the light with respect to the direction of deflection and consistently high-quality video image input/output processing can be carried out.

According to the preferred embodiment of the present invention, the modulating data are stored in the memory in the form of digital data, taking into consideration the frequency-dependency of the deflection efficiency of the acousto-optical element, the drive circuit and the modulator. Preferably, the modulating data can be partially rewritten.

According to another embodiment of the present invention, a second modulator is provided which is connected between the drive signal generating means and the first modulator. A function generator is connected to the second modulator for producing a predetermined function according to which the drive signal is modulated in amplitude by the second modulator. The drive signal modulated by the second modulator is further modulated by the first modulator. This assures that the deflection efficiency of the acousto-optical element is substantially completely independent of the frequency of the drive signal

BRIEF DESCRIPTION OF THE DRAWINGS

The objects and features of the present invention will become more apparent from a consideration of the following detailed description taken in conjunction with the accompanying drawings in which:

FIG. 3 is a block diagram of a light beam deflector according to the present invention, employing a different construction;

FIG. 4 is a graph showing the light beam deflection efficiency correction characteristics in the construction shown in FIG. 3;

DETAILED DESCRIPTION OF THE PREFERRED EMBODIMENTS

The embodiments of the present invention will now be described in the following, with reference to FIGS. 1 to 5.

Figure 1:
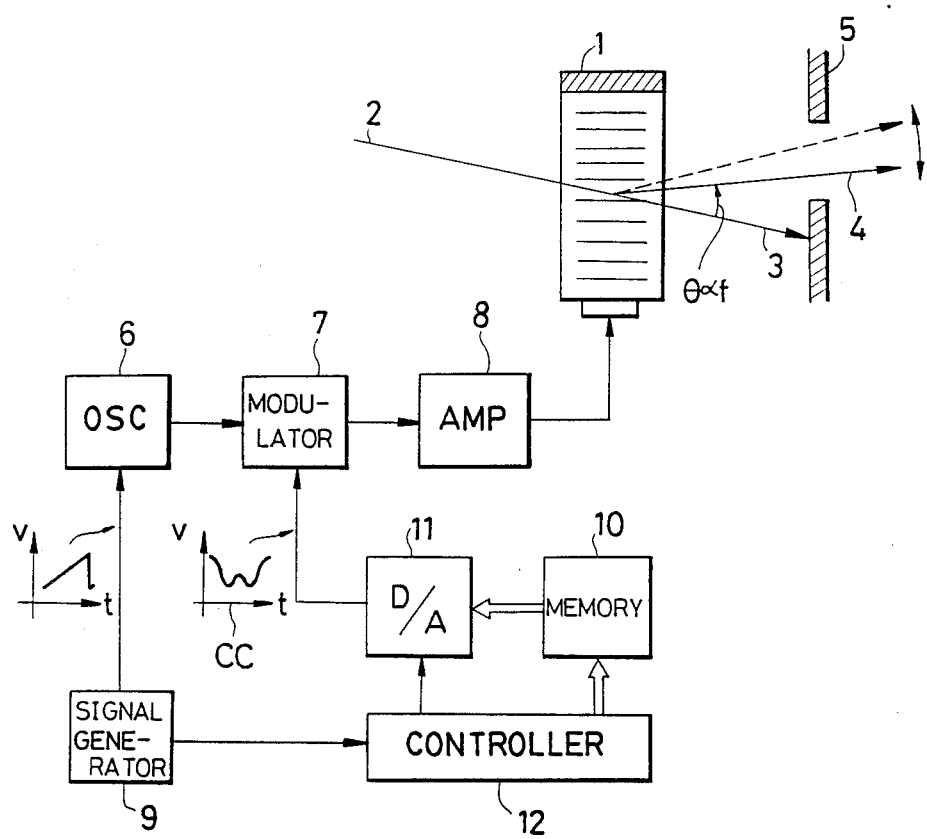
FIG. 1 is a block diagram showing the overall structure of a light beam deflector according to the present invention.

FIG. 1 illustrates one embodiment of a light beam deflector according to the present invention. In FIG. 1, 1 is an acousto-optical element, 2 is an incident light beam, 3 is a straight beam of undeflected zero-order light, 4 is a beam of first-order diffraction light deflected by the element 1, and 5 is an aperture for blocking zero-order light so that only first-order-diffraction light is utilized.

A high-frequency signal generated by a voltage controlled oscillator 6 is passed through a balanced modulator 7 and a broadband power amplifier 8 and applied to the acousto-optic element 1. The output frequency of the voltage controlled oscillator 6 is controlled by the voltage signal applied to the input terminal thereof from a signal generator 9. Therefore, by altering the input voltage, the output frequency, that is, the frequency of the signal that drives the element, can be changed and the light beam deflection angle controlled thereby.

Figure 7:
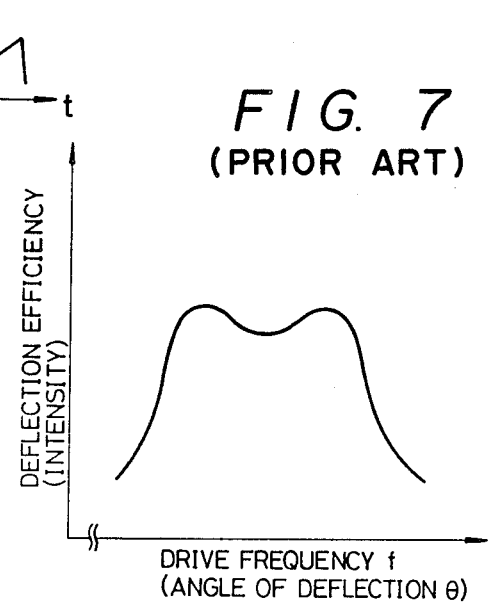
FIG. 7 is a graph illustrating nonuniform deflection efficiency characteristics of the prior art.

In this embodiment, the balanced modulator 7 is provided for correction of the type of deflection efficiency characteristics shown in FIG. 7. Previously, the modulation conditions of this type of balanced modulator 7 were controlled by an analog type function generator, but in this embodiment the modulation conditions of the balanced modulator 7 are prepared beforehand as digital data that are stored in a memory 10, so that the modulation is carried out on the basis of the data stored in the memory 10.

Specifically, amplitude modulation of the element drive signal is performed by taking the digital data stored in the memory 10, passing it through a D/A converter 11 and using the corrected signal thus obtained to control the balanced modulator 7.

Figure 2:
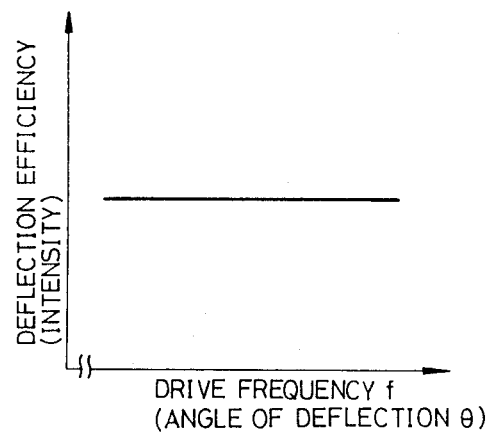
FIG. 2 is a graph showing the light beam deflection efficiency correction characteristics in the construction shown in FIG. 1.

The correction data written into the memory 10 takes into consideration the deflection efficiency characteristics of the element itself, the frequency characteristics of the drive circuitry and the linear characteristics of the modulator 7, all of these characteristics being combined so that ultimately the deflection efficiency is not dependent on the drive signal frequency but, as shown in FIG. 2, becomes perfectly constant.

The amplitude control characteristics corresponding to the frequency characteristics of the balanced modulator 7 based on the data stored in the memory 10 are, as indicated by CC in FIG. 1, the inverse of the characteristics of the acousto-optical element 1 and the drive system (the characteristics shown here are in the case where the drive frequency is increased with time t).

An address signal and clock signal obtained from a control circuit 12 comprised of a microcomputer or logic circuit are applied to the memory 10 and the D/A converter 11 so as to obtain a correction signal in synchronization with the deflection process. The timing of the data read-out under the control of the control circuit 12 is controlled by a synchronization signal from the signal generator 9.

With the above arrangement, by using the signal generator 9 to control the voltage controlled oscillator 6 and generating and changing a desired acousto-optical element drive frequency based on the deflection conditions, in synchronization with this, the modulation data are read out from the memory 10 by the control circuit 12, converted to analog data by the D/A converter 11 and input into the balanced modulator 7. The balanced modulator 7 is controlled with the kind of inverse characteristics, indicated by the symbol CC, corresponding to the deflection efficiency characteristic resulting from the acousto-optical element 1 and the drive system, so that ultimately the deflection efficiency is not dependent on the drive frequency but, as shown in FIG. 2, becomes perfectly constant.

With the above arrangement, as the modulation condition data for the balanced modulator 7 are stored in the memory 10, it is easy to produce inverse characteristics data that achieve the desired correction conditions, taking into consideration the characteristics of the drive system and the like. Also, even if fluctuations arise in, for example, the wavelength of the light, the angle of incidence and the scanning frequency, and the deflection efficiency characteristics change, it is extremely easy to amend the modulation data. Also, when the characteristics of just one portion are changed, such as when a correction signal is generated by the analog function generation circuit, because it is possible to change the characteristics of specific portions as desired, the characteristics of other portions do not have to be sacrificed.

FIG. 3 shows another embodiment of this invention. In FIG. 3, parts which are the same as, or correspond to, the parts of the embodiment described in the above have been given the same symbols.

The arrangement illustrated in FIG. 3 employs both analog-type correction and the above-described type of correction based on digital data. Similarly to the arrangement shown in FIG. 1, a high-frequency signal generated by the voltage controlled oscillator 6 is applied to the acousto-optical element 1 after being passed through two balanced modulators 71 and 72 and the broadband power amplifier 8.

A signal that is generated by a function generator 13 consisting of an analog circuit for the purpose of substantially correcting nonuniformity of deflection efficiency is applied to the first balanced modulator 71 to thereby carry out amplitude modulation of the drive signal.

The inverse characteristic of the deflection efficiency such as that shown in FIG. 7 can be approximated as a fourth-order function, for example, so that by combining functions, such as by means of an operational amplifier or the like, the function generator 13 can be configured to generate a high-order waveform from a control voltage waveform. In the drawing the control characteristics of the balanced modulator 71 are indicated by the symbol CC'.

In this embodiment the latter-stage second balanced modulator 72 performs amplitude modulation using a correction signal obtained by D/A conversion of the data in the memory 10 by the D/A converter 11, for a more complete correction of nonuniformity in the deflection efficiency. In the drawing the control characteristics of the balanced modulator 72 are indicated by the symbol CC''.

Stored in the memory 10 are data that are such that the result of combining the characteristics of the acousto-optical element itself with the characteristics of the drive circuit system is a uniform deflection efficiency that is not dependent on the drive frequency.

Figure 6:
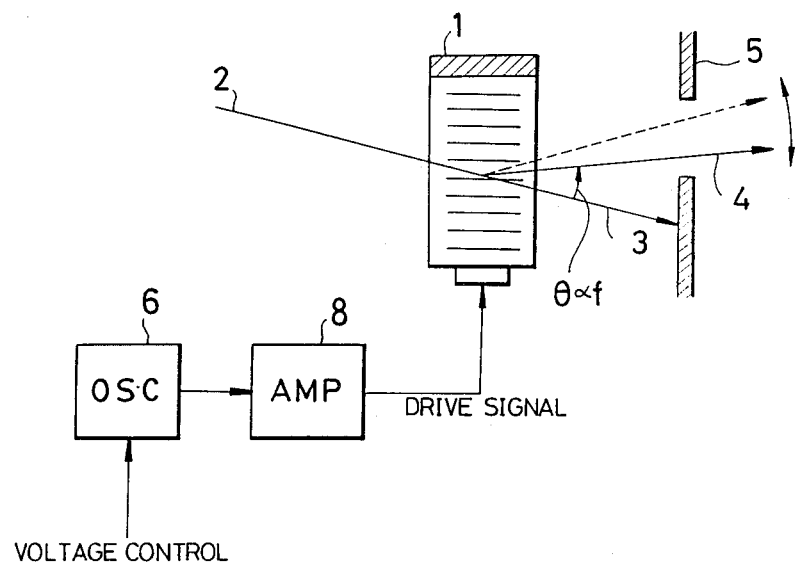
FIG. 6 is a block diagram showing the construction of a conventional light beam deflector.

FIG. 4 shows the difference in the deflection efficiency characteristics arising from differences in the arrangement based on FIG. 3. Symbol A indicates the characteristic curve when correction by the balanced modulators 71 and 72 is not performed (the configuration of FIG. 6); B is the curve obtained when correction is done by the function generator 13 and one of the balanced modulators, modulator 71; and C is the curve obtained when double correction is performed using the two balanced modulators 71 and 72.

On comparing FIGS. 1 and 3, the arrangement of FIG. 3 is more complex but requires a smaller memory capacity. In addition, as in the case of the arrangement of FIG. 3 the degree of modulation in amplitude by the balanced modulator 72 can be smaller than the degree of modulation in amplitude by the balanced modulator 71, the modulation characteristics of the balanced modulator 72 can be regarded as perfectly linear with respect to the data written into the memory. As a result, the type of arrangement shown in FIG. 5 becomes possible for writing data into the memory 10 of FIG. 3.

Figure 5:
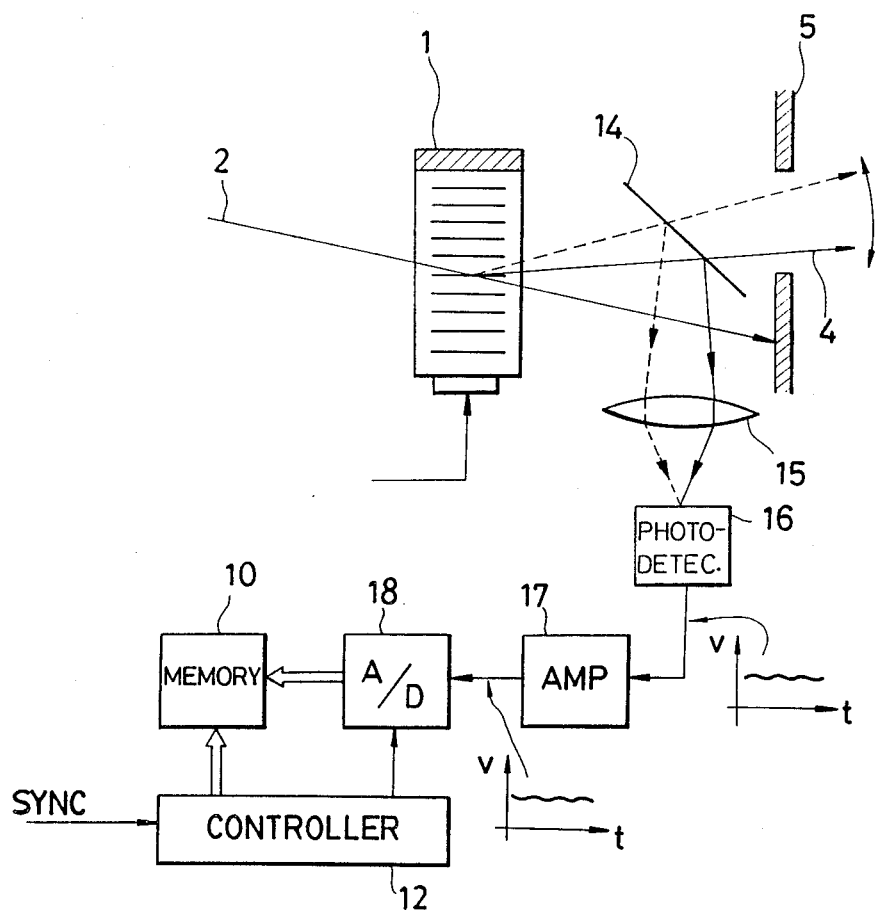
FIG. 5 is a block diagram showing the construction for preparing deflection efficiency correction data.

With reference to FIG. 5, correction is performed by the function generator 13 and the first balanced modulator 71 to drive the acousto-optical element 1, and a portion of the thus-deflected 1st-order diffraction light is split by a beam-splitter 14 and collected on a light-receiving surface of a photodetector 16 via a lens 15.

Here, the signal obtained from the photodetector 16 has the type of waveform indicated by B in FIG. 4 in which the non-uniformity of the deflection efficiency has been substantially corrected. As a result, if the waveform of the signal is inverted by an inverting amplifier 17, converted to digital data by means of an A/D converter 18 and written into the memory 10, it forms correction data providing the requisite settings for making any nonuniformity completely uniform.

With this arrangement, if for example the light wavelength should be changed, slightly altering the deflection efficiency, it is extremely easy to rewrite the correction data that has been stored in the memory.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims

What is claimed is:

1. A light beam reflector adapted to deflect a light beam from a light source, comprising:
   an acousto-optical element for deflecting said light beam at an angle of deflection which is dependent on the frequency of a drive signal applied thereto, said acousto-optical element having a deflection efficiency which is also dependent on the frequency of said drive signal;
   means for generating said drive signal;
   a first modulator for modulating the amplitude of said drive signal with first frequency dependent predetermined modulating data to produce a modulated drive signal;
   a second modulator for modulating the amplitude of said modulated drive signal with second frequency dependent predetermined modulating data; and
   a memory for storing said second modulating data, the modulation of the amplitude of said drive signal being such that said deflection efficiency of said acousto-optical element is substantially independent of the frequency of said drive signal.

2. A light beam deflector as set forth in claim 1, wherein said second modulating data are stored in said memory in the form of digital data.

3. A light beam deflector as set forth in claim 2, comprising means for partially rewriting said second modulating data.

4. A light beam deflector as set forth in claim 1, further comprising a function generator connected to said first modulator for producing a predetermined function according to which said drive signal is modulated in amplitude, said first modulator being connected between said drive signal generating means and said second modulator.

5. The light beam deflector of claim 1, comprising an analog function generator for producing said first predetermined modulating data.

6. The light beam deflector of claim 1, comprising means for detecting portions of the light deflected by said acousto-optical element and applying said detected portions to said memory as said second predetermined modulating data.

7. Apparatus for deflecting light from a light source, comprising:
an acousto-optical deflector element;
means for generating a drive signal for said deflector element;
a first modulator for modulating the amplitude of said drive signal in accordance with first predetermined modulating data to produce a frequency dependent modulated drive signal;
means for detecting a portion of the light deflected by said deflector element thereby to define second predetermined modulating data;
signal processing means for storing said second predetermined modulating data in a memory; and
a second modulator for modulating the amplitude of said modulated drive signal with said second predetermined modulating data whereby the deflection efficiency of said deflector element is substantially independent of the frequency of said drive signal.

8. The apparatus of claim 7, in which said means for producing said first modulating data comprises an analog function generator.

9. The apparatus of claim 7, in which said second modulating data are stored in said memory as digital data.

10. The apparatus of claim 7, in which said signal processing means comprises an inverting amplifier and a digital-to-analog converter.

11. The apparatus of claim 7, in which said memory comprises a rewritable memory.

12. A method for controlling the intensity of a light beam deflected by an acousto-optical deflector element, comprising the steps of:
generating a drive signal for said deflector element;
modulating said drive signal with first modulating data to produce a modulated drive signal;
detecting the intensity of the light deflected by said deflector element;
producing a signal representative of said detected light intensity;
storing said signal as data in a memory; and
modulating said modulated drive signal with the data contents of said memory.

* * * * *